US010436089B2

United States Patent
Khaled et al.

(10) Patent No.: US 10,436,089 B2
(45) Date of Patent: Oct. 8, 2019

(54) RADIO FREQUENCY SENSOR IN AN EXHAUST AFTERTREATMENT SYSTEM

(71) Applicant: Cummins Emission Solutions Inc., Columbus, IN (US)

(72) Inventors: Nassim Khaled, Columbus, IN (US); Sriram Srinivasan, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/408,645

(22) Filed: Jan. 18, 2017

(65) Prior Publication Data

US 2018/0202337 A1 Jul. 19, 2018

(51) Int. Cl.
| | | |
|---|---|---|
| *F01N 3/035* | (2006.01) | |
| *F01N 11/00* | (2006.01) | |
| *F01N 3/20* | (2006.01) | |
| *F01N 3/021* | (2006.01) | |

(52) U.S. Cl.
CPC ............. *F01N 3/035* (2013.01); *F01N 3/021* (2013.01); *F01N 3/2066* (2013.01); *F01N 11/00* (2013.01); *F01N 2560/12* (2013.01); *F01N 2610/02* (2013.01); *F01N 2900/1606* (2013.01); *F01N 2900/1622* (2013.01); *Y02T 10/24* (2013.01); *Y02T 10/47* (2013.01)

(58) Field of Classification Search
CPC .... F01N 3/2066; F01N 3/208; F01N 2610/00; F01N 2610/02; F01N 2610/03; F01N 2900/1606; F01N 2560/05; F01N 2560/06; F01N 2560/08; F01N 2560/026; F01N 2560/12; F01N 2560/14; F01N 2230/02; F01N 2250/08

USPC .................. 60/276, 286, 297, 301, 303, 311
See application file for complete search history.

(56) References Cited

U.S. PATENT DOCUMENTS

| | | | | |
|---|---|---|---|---|
| 7,260,930 | B2 * | 8/2007 | Decou | F01N 9/002 |
| | | | | 60/274 |
| 9,238,986 | B2 * | 1/2016 | Hashida | F01N 3/023 |
| 9,435,244 | B1 * | 9/2016 | Devarakonda | F01N 3/208 |
| 2011/0030343 | A1 * | 2/2011 | Kiser | F01N 3/208 |
| | | | | 60/274 |
| 2011/0239627 | A1 * | 10/2011 | Sisken | F01N 3/208 |
| | | | | 60/276 |
| 2013/0125745 | A1 | 5/2013 | Bromberg et al. | |
| 2015/0355110 | A1 * | 12/2015 | Sappok | G01N 1/44 |
| | | | | 324/639 |

FOREIGN PATENT DOCUMENTS

WO    WO-2015/188188    12/2015

OTHER PUBLICATIONS

International Search Report and Written Opinion issued for PCT/US2018/013843, dated Apr. 6, 2018, 14 pages.

* cited by examiner

*Primary Examiner* — Phutthiwat Wongwian
*Assistant Examiner* — Diem T Tran
(74) *Attorney, Agent, or Firm* — Foley & Lardner LLP

(57) ABSTRACT

A system structured to measure at least one of particulate matter or ammonia in an exhaust aftertreatment system. The system includes a selective catalytic reduction catalyst, a doser disposed upstream of the selective catalytic reduction catalyst, a particulate filter, and a radio frequency sensor communicatively coupled to the diesel particulate filter. The radio frequency sensor is structured to measure at least one of particulate matter or ammonia.

11 Claims, 4 Drawing Sheets

RADIO FREQUENCY SENSOR IN AN EXHAUST AFTERTREATMENT SYSTEM

TECHNICAL FIELD

The present application relates generally to the field of exhaust aftertreatment systems.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to the accumulation of various constituents such as particulate matter, ammonia, etc. Because the accumulation of, for example particulate matter, on the components may have adverse consequences on performance and the emission-reduction capability of the exhaust aftertreatment system, architecture of an exhaust aftertreatment system structured to detect and, if possible, correct such particulate matter is desirable.

SUMMARY

A first example embodiment relates to an aftertreatment system comprising a selective catalytic reduction catalyst, a doser, a particulate filter and a radio frequency sensor. The doser is disposed upstream of the selective catalytic reduction catalyst. The radio frequency sensor is communicatively coupled to the particulate filter. The radio frequency sensor is structured to measure at least one of particulate matter or ammonia.

A second example embodiment relates to an aftertreatment system comprising a selective catalytic reduction catalyst, a doser, and a selective catalytic reduction on filter. The doser is disposed upstream of the selective catalytic reduction catalyst. The radio frequency sensor is communicatively coupled to the selective catalytic reduction on filter. The radio frequency sensor is structured to measure at least one of particulate matter or ammonia A third example embodiment relates to a system comprising a selective catalytic reduction catalyst, a plurality of dosers, a selective catalytic reduction on filter, and a radio frequency sensor. The plurality of dosers is in fluid communication with the selective catalytic reduction catalyst. The radio frequency sensor is communicatively coupled to the selective catalytic reduction on filter. The radio frequency sensor is structured to measure at least one of particulate matter or ammonia.

A fourth example embodiment relates to an apparatus comprising a selective catalytic reduction catalyst, a filter disposed upstream of the selective catalytic reduction catalyst, and a radio frequency sensor. The radio frequency sensor is communicatively coupled to the filter. The radio frequency sensor comprises a measurement control circuit structure to receive data indicative of at least one of particulate matter or ammonia and measure storage of the at least one of particulate matter or ammonia.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
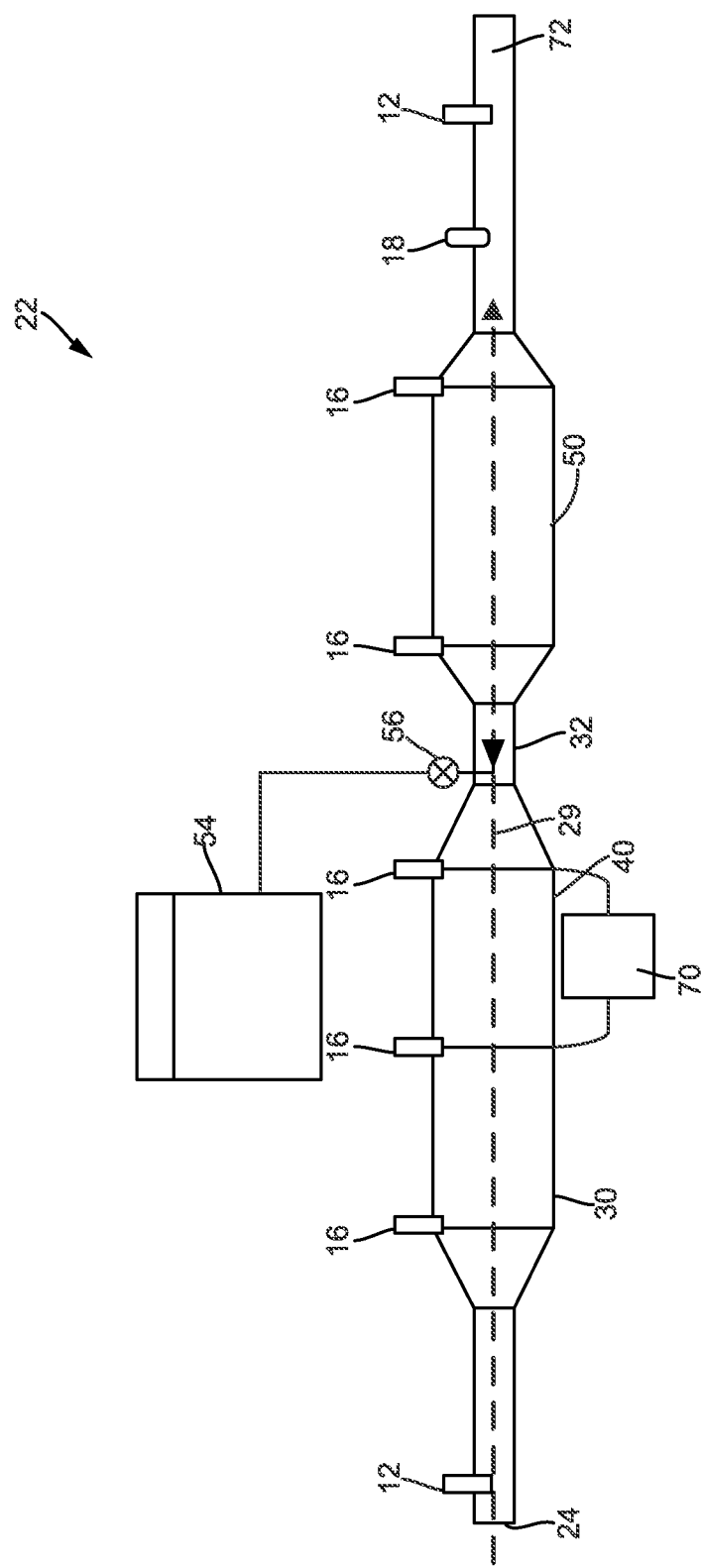
FIG. 1 is a schematic diagram of an exhaust aftertreatment system with a radio frequency sensor, according to a first example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the Figures generally, the various embodiments disclosed herein relate generally to a system and apparatus structured to measure particulate matter and/or ammonia in an exhaust aftertreatment system. According to the present disclosure, the system includes a selective catalytic reduction catalyst, a doser disposed upstream of the selective catalytic reduction catalyst, a diesel particulate filter, and a radio frequency sensor communicatively coupled to the diesel particulate filter. The radio frequency sensor is structured to measure at least one of particulate matter or ammonia.

Various embodiments of the systems and apparatus described herein are structured to measure the particulate matter and/or the ammonia in an exhaust aftertreatment system and may provide benefits that include, for example (1) reducing cost of sensors; (2) reducing the size of filter (e.g., the diesel particulate filter); and (3) improving the accuracy in measuring particulate matter.

FIG. 1 depicts an exhaust aftertreatment system 22 according to a first example embodiment. It should be understood that the schematic depicted in FIG. 1 is but one implementation of an exhaust aftertreatment system. Many different configurations may be implemented that utilize the systems and methods described herein. Accordingly, while the system and method described herein are primarily directed to the diesel or compression-ignition engine exhaust aftertreatment system depicted in FIG. 1, it should be understood that the system and method of the present disclosure may be used in various exhaust aftertreatment system configurations, such that the embodiment depicted in FIG. 1 is not meant to be limiting.

Although not shown, the exhaust aftertreatment system 22 may be in exhaust gas-receiving communication with an engine (e.g., an internal combustion engine). Within the internal combustion engine, air from the atmosphere is combined with fuel and combusted to power the engine. Combustion of the fuel and air in the compression chambers of the engine produces exhaust gas that is operatively vented to an exhaust manifold and to the exhaust aftertreatment system 22. NOx (nitrogen oxides including NO and NO$_2$) is a byproduct of combustion. The emission of NOx from an engine may be undesirable due to NOx (along with other compounds) having the ability to form smog, acid rain, and other types of pollution.

As shown in FIG. 1, the exhaust aftertreatment system 22 includes a filter 40 (e.g., a diesel particulate filter (DPF), a selective catalytic reduction on filter (referred to herein as SDPF), etc.), a selective catalytic reduction catalyst (SCR) 50, and a radio frequency sensor 70. The exhaust aftertreatment system also includes an oxidation catalyst such as a diesel oxidation catalyst (DOC) 30, a NOx sensor 12, a temperature sensor 16, and a particulate matter (PM) sensor 18.

The filter 40 is structured to reduce particulate matter concentrations (e.g., soot and ash) in the exhaust gas to meet or substantially meet requisite emission standards. The filter 40 may be any of various flow-through or wall-flow designs. In some embodiments, the filter 40 may take the form of a DPF or SDPF. The filter 40 captures particulate matter and other constituents, and thus may need to be periodically regenerated to burn off the captured constituents. Additionally, the filter 40 may be configured to oxidize NO to form NO$_2$ independent of the DOC 30 described herein below.

The radio frequency sensor 70 may be communicatively coupled to the filter 40 (e.g., a DPF or SDPF). As depicted, the radio frequency sensor 70 is disposed upstream of the SCR 50. Alternatively or additionally, the radio frequency sensor 70 may be disposed downstream of the SCR 50. Although a single radio frequency sensor 70 is depicted, some configurations may include a plurality of radio frequency sensors 70.

The radio frequency sensor 70 is structured to measure at least one of particulate matter (e.g., ash, soot, etc.) or ammonia. To that end, the radio frequency sensor 70 may transmit a radio frequency signal. In some embodiments, the radio frequency sensor 70 may receive the radio frequency signal. The radio frequency signal may propagate through the filter 40 (e.g., the DPF, the SDPF, etc.), the SCR 50, other components of the exhaust aftertreatment system 22, or combinations thereof. The radio frequency sensor 70 measures the particulate matter (e.g., the ash, soot, etc.) and/or ammonia on or otherwise associated with the filter 40 responsive to the propagation of the radio frequency signal through the filter 40 (e.g., the DPF, the SDPF, etc.), the SCR 50, or other components of the exhaust aftertreatment system 22. Advantageously, measurement of the particulate matter (e.g., ash, soot, etc.) and/or ammonia negates the need for separate sensors to acquire data indicative of the particulate matter, ash, soot, and/or ammonia in or on the filter 40 and/or the exhaust aftertreatment system 22.

The radio frequency sensor 70 is further structured to control the ammonia stored on the filter 40 (e.g., the SDPF). The radio frequency sensor 70 is structured to acquire data indicative of an ammonia (NH3) amount on the SDPF. To that end, the radio frequency sensor 70 may generate or otherwise transmit a radio frequency signal proportional to the ammonia stored on the filter 40. The radio frequency sensor 70 may include or otherwise be communicatively coupled to a controller structured to control the ammonia stored on the filter 40 by utilizing the radio frequency signal generated or otherwise transmitted by the radio frequency sensor 70. The controller may compare the radio frequency signal to a predetermined ammonia amount (e.g., a targeted ammonia storage amount) calibrated for the filter 40. Based on the comparison of the radio frequency signal to the predetermined ammonia amount, the controller may generate a command structured to control or otherwise modulate (e.g., modify, adjust, etc.) the DEF dosing accordingly. The radio frequency sensor 70, the NOx sensor 12, the temperature sensor 16, or a combination thereof pre and post catalyst may be communicably connected to control the ammonia stored on the filter 40.

As described herein, the radio frequency sensor 70 may include or otherwise be communicatively coupled to a controller. The controller may be structured to control or at least partly control the operation of the radio frequency sensor 70 and associated components of the exhaust aftertreatment system 22. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, Bluetooth, cellular, radio, etc. In one embodiment, a controller area network (CAN) bus provides the exchange of signals, information, and/or data. The CAN bus includes any number of wired and wireless connections. Because the controller can be communicably coupled to the systems and components of FIG. 1, the controller is structured to receive data from one or more of the components shown in FIG. 1. Accordingly, the controller is can be communicably coupled to one or more of the various other sensors such as, for example, temperature sensors (e.g., the temperature sensor 16), NOx sensors (e.g., the NOx sensor 12), pressure sensors, oxygen sensors, ammonia sensors and/or any other sensors. The controller may be communicatively coupled to one or more such sensors to receive and interpret signals, information, or data from one or more of these sensors as described herein. The controller may use the information from one or more of these sensors to carry out the functions as described herein.

As shown, the exhaust aftertreatment system 22 includes the NOx sensors 12 and the temperature sensors 16. The temperature sensors 16 are structured to acquire data indicative of a temperature at their respective locations. As depicted, the temperature sensors 16 acquire data indicative of the temperature at each respective an inlet, outlet, or combination thereof of the DOC 30, the filter 40, and the SCR 50. The NOx sensors 12 are structured to acquire data indicative of a NOx amount at each location that a respective NOx sensor is located. A NOx sensor 12 may be disposed at an inlet 24 of the exhaust aftertreatment system 22 upstream of the DOC 30. Alternatively or additionally, a NOx sensor 12 may be disposed at an outlet 72 of the exhaust aftertreatment system 22 downstream of the SCR 50. The exhaust aftertreatment system 22 may include a PM sensor 18. The PM sensor 18 is structured to monitor particulate matter flowing through the exhaust aftertreatment system 22. For example, as depicted, the PM sensor 18 is structured to monitor particulate matter flowing through the exhaust aftertreatment system 22 downstream of the SCR 50 such that the PM sensor 18 is disposed at least at an outlet 72 of the exhaust aftertreatment system 22 downstream of the SCR 50. As shown, a plurality of sensors are included in the exhaust aftertreatment system 22. The number, placement, and type of sensors included in the exhaust aftertreatment system 22 is shown for example purposes only. In other configurations, the number, placement, and type of sensors may differ.

The exhaust aftertreatment system 22 includes the DOC 30. The DOC 30 is structured to oxidize at least some particulate matter, e.g., soot, in the exhaust and reduce unburned hydrocarbons and/or carbon monoxide (CO) in the exhaust to less environmentally harmful compounds. For example, the DOC 30 is structured to reduce the hydrocarbon and CO concentrations in the exhaust to meet the requisite emissions standards for those components of the exhaust gas. The DOC 30 may have any of various flow-through designs. As depicted, the DOC 30 is disposed upstream of the filter 40 (e.g., DPF, SDPF, etc.). In some configurations, the DOC 30 may be disposed downstream of the SCR 50. An indirect consequence of the oxidation capabilities of the DOC 30 is the ability of the DOC to oxidize NO into NO2. In addition to treating the hydrocarbon and CO concentrations in the exhaust gas, the DOC 30 may also be used in the controlled regeneration of the filter 40, SCR 50, and/or an ammonia oxidation/ammonia slip catalyst (AMOX) (not shown). This may be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the filter 40, SCR 50, and/or the AMOX. The amount of unburned HC added to the exhaust gas is selected to achieve the desired temperature increase or target controlled regeneration temperature.

As shown, the exhaust aftertreatment system 22 also includes a reductant source 54. The reductant source 54 supplies reductant, such as, for example, ammonia (NH3), diesel exhaust fluid (DEF) (e.g., urea), or hydrocarbons, to the doser 56. In some embodiments, the reductant source 54 may be a container or tank capable of retaining the reductant. In an exhaust flow direction, as indicated by directional arrow 29, exhaust gas flows from the engine (not shown) into the inlet 24 of the exhaust aftertreatment system 22. From the inlet 24, the exhaust gas flows into the DOC 30 and exits the DOC into the filter 40 (e.g., the DPF, SDPF, etc.) and exits the filter 40 into a section of exhaust piping 32. From the section of exhaust piping 32, the exhaust gas flows into the SCR 50 and exits the SCR 50.

Figure 2:
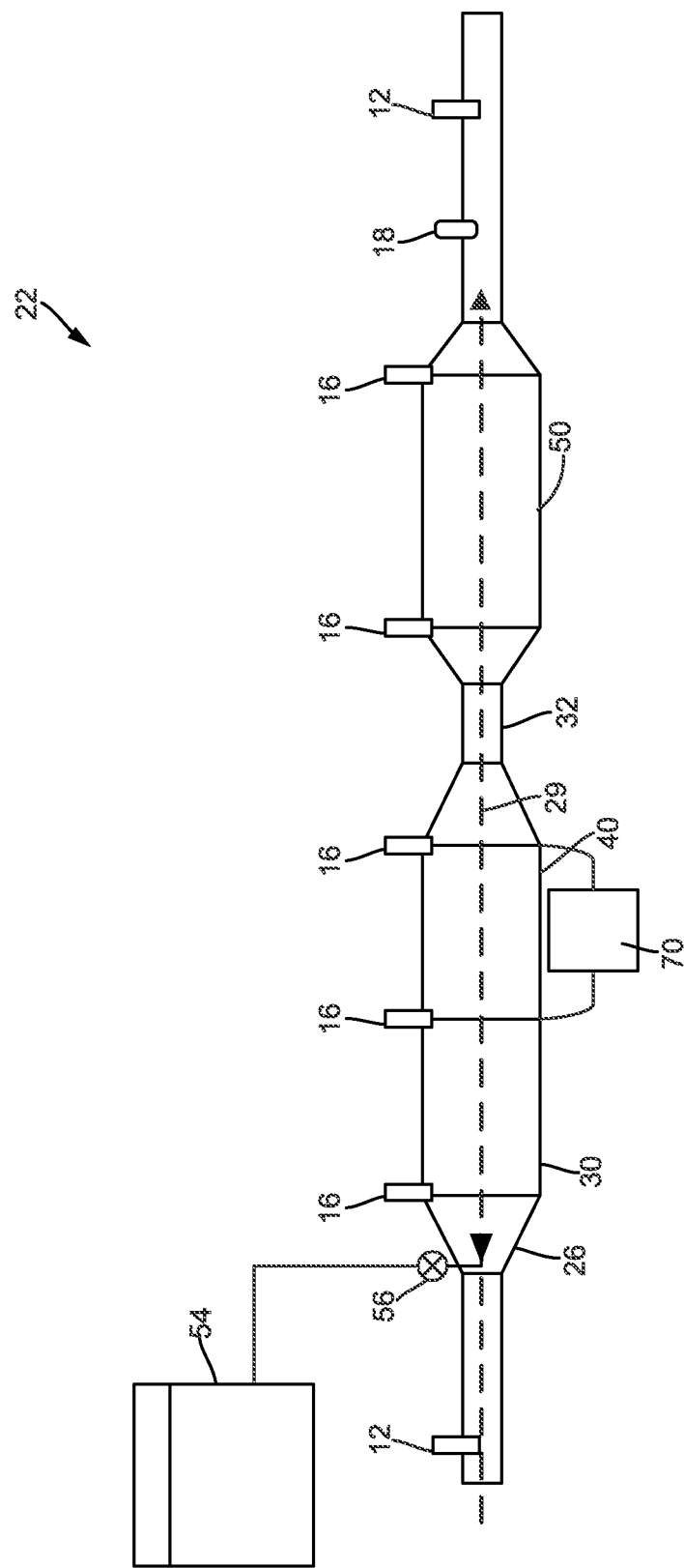
FIG. 2 is a schematic diagram of an exhaust aftertreatment system with a radio frequency sensor, according to a second example embodiment.

The doser 56 is structured to dose the exhaust gas with reductant. The doser 56 is selectively controllable to inject reductant directly into the exhaust gas stream prior to entering the SCR 50. To that end, the doser 56 may be disposed upstream of the SCR 50. For example, as the exhaust gas flows through the section of exhaust piping 32 downstream of the filter 40 and upstream of the SCR 50, the exhaust gas is dosed with reductant by the doser 56. In some configurations, the exhaust gas may be dosed with reductant by the doser 56 as the exhaust gas flows through the section of exhaust piping 26 located upstream of the DOC 30 as shown in FIG. 2. Accordingly, each section of exhaust piping 26, 32 acts as a decomposition chamber or tube to facilitate the decomposition of the reductant to ammonia.

Figure 3:
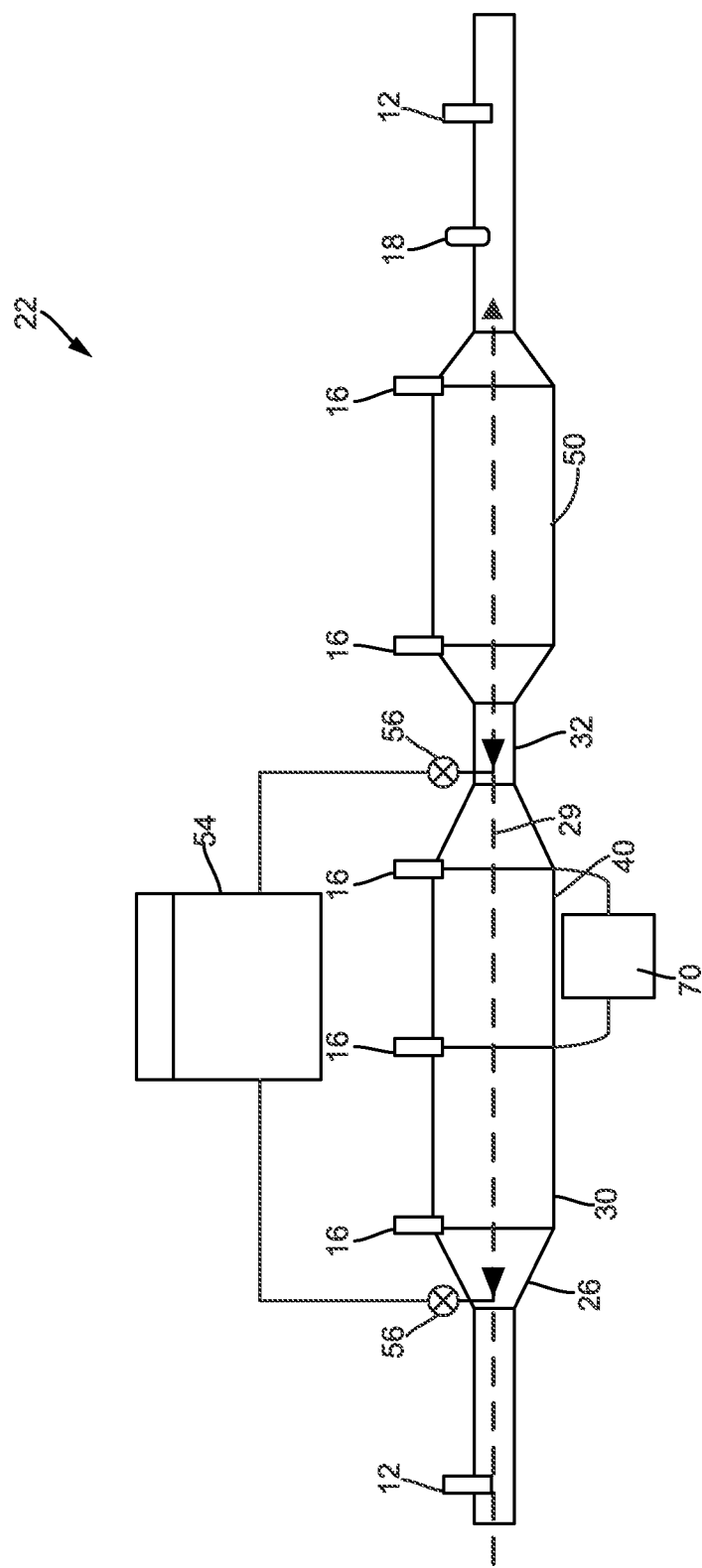
FIG. 3 is a schematic diagram of an exhaust aftertreatment system with a radio frequency sensor, according to a third example embodiment.

In some embodiments, the exhaust aftertreatment system 22 may include a plurality of dosers 56 as shown in FIG. 3. The plurality of dosers 56 may be in fluid communication with exhaust gas flowing through the various components of the exhaust aftertreatment system 22. In some embodiments, the plurality of dosers may include a first doser 56 disposed upstream of the DOC 30 and a second doser 56 disposed downstream of filter 40. However, in alternative embodiments, other arrangements of the components of the exhaust aftertreatment system 22 are also possible.

With reference back to FIG. 1, the SCR 50 is structured to assist in the reduction of NOx emissions by accelerating a NOx reduction process between the ammonia and the NOx of the exhaust gas into diatomic nitrogen, water, and/or carbon dioxide. The SCR 50 includes an inlet in fluid communication with the decomposition chamber from which exhaust gas and reductant is received. The SCR 50 may be any of various catalysts known in the art. For example, in some implementations, the SCR 50 is a vanadium-based catalyst, and in other implementations, the SCR catalyst is a zeolite-based catalyst, such as a Cu-Zeolite or a Fe-Zeolite catalyst.

In some embodiments, the exhaust aftertreatment system 22 may include an AMOX catalyst (not shown). In such embodiments, the exhaust gas may flow into the AMOX and exit the AMOX into outlet piping before the exhaust gas is expelled from the exhaust aftertreatment system 22. The AMOX may be any of various flow-through catalysts configured to react with ammonia to produce mainly nitrogen. As briefly described above, the AMOX is structured to remove ammonia that has slipped through or exited the SCR 50 without reacting with NOx in the exhaust. In certain instances, the exhaust aftertreatment system 22 may be operable with or without an AMOX. Further, although the AMOX is shown as a separate unit from the SCR 50 in FIG. 1, in some implementations, the AMOX may be integrated with the SCR catalyst, e.g., the AMOX and the SCR catalyst can be located within the same housing. In some embodiments, the SCR catalyst and AMOX may be positioned serially, with the SCR catalyst preceding the AMOX. As shown in the embodiment depicted, the AMOX is not included in the exhaust aftertreatment system 22. Accordingly, the NOx sensor 12 may be excluded from the exhaust aftertreatment system 22 depending upon particular system requirements.

As mentioned above, although the exhaust aftertreatment system 22 shown includes one of a radio frequency sensor 70, a DOC 30, a filter 40, and a SCR 50 positioned in specific locations relative to each other along the exhaust flow path 29, in other embodiments, the exhaust aftertreatment system 22 may include more than one of any of the various catalysts positioned in any of various positions relative to each other along the exhaust flow path as desired.

Figure 4:
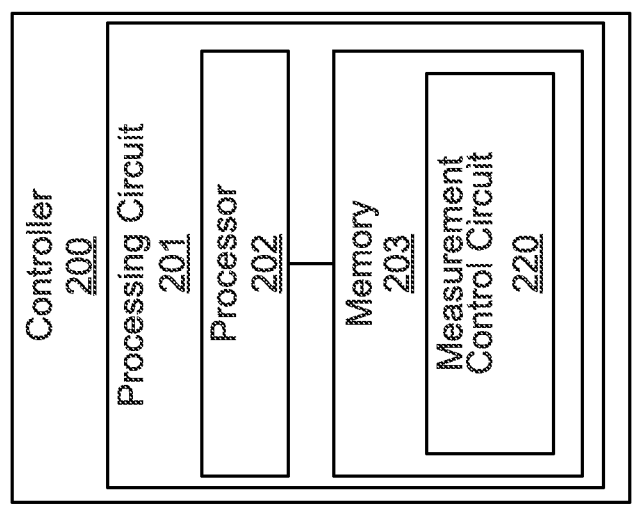
FIG. 4 is a schematic diagram of controller of the radio frequency sensor, according to an example embodiment.

As described herein, the radio frequency sensor 70 may include or otherwise be communicatively coupled to a controller such as the controller 200 illustrated in FIG. 4 according to one embodiment. As shown, the controller 200 includes a processing circuit 201 including a processor 202 and a memory 203. The processor 202 may be implemented as a general-purpose processor, an ASIC, one or more field programmable gate arrays (FPGAs), a digital signal processor (DSP), a group of processing components, or other suitable electronic processing components. The one or more memory devices 203 (e.g., RAM, ROM, Flash Memory, hard disk storage, etc.) may store data and/or computer code for facilitating the various processes described herein. Thus, the one or more memory devices 203 may be communicably connected to the processor 202 and provide computer code or instructions to the processor 202 for executing the processes described in regard to the controllers herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 may include various circuits for completing at least some of the activities described herein. More particularly, the memory 203 includes the measurement control circuit 220 which is structured to facilitate the measurement of at least one of the particulate matter (e.g., ash, soot, etc.) or ammonia. While the memory 203 of the controller 200 depicted is shown to include the measurement control circuit 220 it should be understood that the controller 200 and the memory 203 may include any number of circuits for completing the functions described herein. For example, the activities of multiple circuits may be combined as a single circuit, additional circuits with additional functionality may be included, etc. Further, it should be understood that the controller 200 may control other activity beyond the scope of the present disclosure, such as the control of other radio frequency sensors, other sensors (e.g., the sensors 14, 16, 18), exhaust aftertreatment system components, and/or vehicle systems. In this regard, the controller 200 may be embodied as an electronic control unit (ECU), proportional integrated controller (PID), etc. included with radio frequency sensor or included with an existing ECU, such as any other vehicle control unit (e.g., an exhaust aftertreatment control unit, selective catalytic reduction catalyst control unit, powertrain control circuit, engine control circuit, etc.). All such structural configurations of the controller 200 are intended to fall within the spirit and scope of the present disclosure. Some example configurations may include a single controller 200 or a plurality of controllers 200.

The measurement control circuit 220 may be structured to receive data indicative of the particulate matter (e.g., the ash, soot, etc.), ammonia, etc. that is present. The data may be received via the radio frequency signal structured to propagate through the filter 40 (e.g., the diesel particulate filter, the SDPF, etc.), the SCR 50, other components of the exhaust aftertreatment system 22, or a combination thereof. In some example embodiments, the measurement control circuit 220 may be structured to receive data from one or more of the sensors (temperature sensors (e.g., the temperature sensor 16), NOx sensors (e.g., the NOx sensor 12), ammonia sensors, pressure sensors, oxygen sensors, and/or any other sensors). The measurement control circuit 220 may be communicably coupled to each of the sensors in the exhaust aftertreatment system 22. For example, the measurement control circuit 220 may receive data indicative of the ammonia stored on the filter 40. In some examples, the measurement control circuit 220 may receive data indicative of the temperature at the location of one or more temperature sensors 16. The received data may be used by the controller 200 to control one more components in the aftertreatment system and/or for monitoring and diagnostic purposes.

In some examples, the received data associated with the particulate matter, such as the ash and/or soot, and/or ammonia may be utilized, by the measurement control circuit 220, to measure, determine, or otherwise interpret storage of various particulate matter and/or ammonia in the aftertreatment system. The storage of the particulate matter, ammonia, etc. may be measured, determined, and/or interpreted by the measurement control circuit 220 based on the respective parameters (e.g., dielectric properties, chemical composition, etc.) of the particulate matter and/or ammonia. For example, the dielectric constant of soot may be different from the dielectric constant of ash. As such, the parameters may include predetermined data (e.g., the dielectric constant of the respective particulate matter) or calculated data derived according to a programmatic algorithm. In some embodiments, the measurement control circuit 220 may be structured to compare the received data to the predetermined data or calculated data to measure the storage of the particulate matter and/or the ammonia on the filter 40 and/or other components downstream of the filter 40 included in the exhaust aftertreatment system 22. The received data, predetermined data or calculated data, and any associated parameters described herein may be stored in memory (e.g., memory 203) by the measurement control circuit 220.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

A computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a computer or entirely on the computer or server. In the latter scenario, the computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An aftertreatment system comprising:
    a selective catalytic reduction catalyst;
    a selective catalytic reduction on filter;
    a doser disposed upstream of the selective catalytic reduction catalyst and the selective catalytic reduction on filter, the doser being configured to dose exhaust gas with reductant;
    a radio frequency sensor communicatively coupled to the selective catalytic reduction on filter, the radio frequency sensor being configured to transmit a radio frequency signal that propagates through the selective catalytic reduction on filter, and to acquire data indicative of a particulate matter amount and an ammonia amount present in the selective catalytic reduction on filter responsive to the propagation of the radio frequency signal; and
    a controller communicatively coupled to the radio frequency sensor, the controller comprising a control circuit configured to receive the data indicative of the particulate matter amount and the ammonia amount present in the selective catalytic reduction on filter, and to control dosing the reductant by the doser based on a comparison of the ammonia amount indicated by the data acquired by the radio frequency sensor with a target ammonia storage amount in the selective catalytic reduction on filter.

2. The aftertreatment system of claim 1, further comprising an oxidation catalyst configured to oxidize hydrocarbons, carbon monoxide, or a combination thereof, the oxidation catalyst disposed upstream of the selective catalytic reduction on filter.

3. The aftertreatment system of claim 2, wherein the doser is disposed upstream of the oxidation catalyst.

4. The aftertreatment system of claim 2, further comprising one or more temperature sensors disposed at at least one of an inlet and an outlet of at least one of the oxidation catalyst, the selective catalytic reduction on filter, or the selective catalytic reduction catalyst.

5. The aftertreatment system of claim 2, further comprising one or more nitrogen oxide (NOx) sensors disposed at least one of an inlet of the system upstream of the oxidation catalyst and at an outlet of the system downstream of the selective catalytic reduction catalyst.

6. The aftertreatment system of claim 1, further comprising one or more particulate matter sensors disposed at least at an outlet of the system downstream of the selective catalytic reduction catalyst.

7. A system comprising:
    a selective catalytic reduction catalyst;
    a selective catalytic reduction on filter;
    a plurality of dosers configured to dose exhaust gas with reductant, the plurality of dosers including a first doser disposed upstream of the selective catalytic reduction on filter, and a second doser disposed downstream of the selective catalytic reduction on filter and upstream of the selective catalytic reduction catalyst;

a radio frequency sensor communicatively coupled to the selective catalytic reduction on filter, the radio frequency sensor being configured to transmit a radio frequency signal that propagates through the selective catalytic reduction on filter, and to acquire data indicative of a particulate matter amount and an ammonia amount present in the selective catalytic reduction on filter responsive to the propagation of the radio frequency signal; and a controller communicatively coupled to the at least one radio frequency sensor, the controller comprising a control circuit configured to receive the data indicative of the particulate matter amount and the ammonia amount present in the selective catalytic reduction on filter, and to control dosing the reductant by the plurality of dosers based on a comparison of the ammonia amount indicated by the data acquired by the radio frequency sensor with a target ammonia storage amount in the selective catalytic reduction on filter.

8. The aftertreatment system of claim 7, further comprising an oxidation catalyst configured to oxidize hydrocarbons, carbon monoxide, or a combination thereof in the exhaust gas, and wherein the oxidation catalyst is disposed at least one of downstream of the selective catalytic reduction catalyst or upstream of the selective catalytic reduction on filter.

9. The aftertreatment system of claim 8, wherein the first doser is disposed upstream of the oxidation catalyst.

10. The aftertreatment system of claim 7, wherein the plurality of dosers are disposed upstream of the selective catalytic reduction on filter.

11. An apparatus comprising:

a selective catalytic reduction catalyst;

a selective catalytic reduction on filter disposed upstream of the selective catalytic reduction catalyst;

a doser disposed upstream of the selective catalytic reduction on filter, the doser being configured to dose exhaust gas with reductant;

a radio frequency sensor communicatively coupled to the selective catalytic reduction on filter, the radio frequency sensor being configured to transmit a radio frequency signal that propagates through the selective catalytic reduction on filter, and to acquire data indicative of a particulate matter amount and an ammonia amount on or associated with the selective catalytic reduction on filter responsive to the propagation of the radio frequency signal; and a controller communicatively coupled to the radio frequency sensor, the controller comprising a control circuit configured to receive the data indicative of the particulate matter amount and the ammonia amount and determine the particulate matter amount and the ammonia amount on or associated with the selective catalytic reduction on filter, and to control dosing the reductant by the doser based on a comparison of the ammonia amount indicated by the data acquired by the radio frequency sensor with a target ammonia storage amount in the selective catalytic reduction on filter.

* * * * *